(12) United States Patent
Gühring

(10) Patent No.: US 7,423,640 B2
(45) Date of Patent: Sep. 9, 2008

(54) METHOD AND SYSTEM FOR PANORAMIC DISPLAY OF MEDICAL IMAGES

(75) Inventor: Jens Gühring, Langensendelbach (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 229 days.

(21) Appl. No.: 11/109,127

(22) Filed: Apr. 19, 2005

(65) Prior Publication Data

US 2005/0237324 A1  Oct. 27, 2005

Related U.S. Application Data

(60) Provisional application No. 60/564,925, filed on Apr. 23, 2004.

(51) Int. Cl.
*G06T 15/00* (2006.01)
(52) U.S. Cl. .................. 345/419; 345/424; 348/118
(58) Field of Classification Search .......... 345/419, 345/424; 348/118
See application file for complete search history.

(56) References Cited

U.S. PATENT DOCUMENTS 5,187,658 A * 2/1993 Cline et al. ............ 382/128

OTHER PUBLICATIONS

Marc Levoy, Efficient ray tracing of volume data, ACM Transactions on Graphics (TOG), v.9 n.3, p. 245-261, Jul. 1990.*
F. Kenton Musgrave, "A Panoramic Virtual Screen for Ray Tracing", Graphics Gems, 1992, pp. 288-294.*
Panoramic Images, Technical Report, Latest amentment: Aug. 7, 2000, © ITB CompuPhase, 1999-2000.*
Acrobat Reader 6.0 Help, © 2003 Adobe Systems Incorporated.*
"Distributed interactive ray tracing for large volume visualization", DeMarle, D.E., Parker, S., Hartner, M., Gribble, C., Hansen, C. Utah Univ., Salt Lake City, UT, USA; This paper appears in: Parallel and Large-Data Visualization and Graphics, 2003. PVG 2003. IEEE Symposium on, Publication Date: Oct. 20-21, 2003, On pp. 87-94.*

* cited by examiner

*Primary Examiner*—Kimbinh T Nguyen

(57) ABSTRACT

A method for displaying a medical image comprises selecting a point in a medical image, creating a panoramic digital image by propagating a plurality of rays from said selected point, wherein said panoramic digital image comprises a plurality of pixels, each pixel being associated with one of the propagated rays, wherein the value associated with each pixel is computed by integrating an opacity value associated with each point in the image along the path of each ray through the image, wherein the integration of the opacity value is terminated once a threshold value is reached, and viewing said panoramic digital image in an interactive display application. The interactive display application enables the view to zoom and pan the image, as well as changing orientation. The panoramic digital image can be incorporated into a patient medical record and stored in a database.

34 Claims, 3 Drawing Sheets

METHOD AND SYSTEM FOR PANORAMIC DISPLAY OF MEDICAL IMAGES

CROSS REFERENCE TO RELATED UNITED STATES APPLICATIONS

This application claims priority from "Panoramic Display of Medical Images", U.S. Provisional Application No. 60/564,925 of Jens Guehring, filed Apr. 23, 2004, the contents of which are incorporated herein by reference.

TECHNICAL FIELD

This invention is directed to the interactive display of digital medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

The rendering of medical image data is very demanding in terms of hardware requirements for computation, data storage, and transmission, but also in terms of selection of appropriate parameters for controlling the display. Recent developments regarding electronic patient record management and increasing functionality for online management of healthcare, however, suggest the desirability for an easy-to-use, low-end visualization technology. This would, for example, allow patients to access from their homes examination records that include medical images.

SUMMARY OF THE INVENTION

Exemplary embodiments of the invention as described herein generally include methods and systems for the panoramic display of digital medical images from volumetric datasets.

According to an aspect of the invention there is provided a method for visualizing a digital medical image comprising the steps of providing an image with a plurality of intensities corresponding to a domain of points in a 3-dimensional space, selecting a point in the domain of the image, propagating a plurality of rays from said selected point to a virtual display screen that surrounds the selected point, wherein said virtual display screen comprises a plurality of pixels, and the value associated with each pixel is computed along the path of each ray through the image domain, generating a panoramic digital photograph from said virtual display screen, and providing said panoramic digital photograph to an interactive display application.

According to a further aspect of the invention, the value associated with each pixel is computed by integrating an opacity value associated with each domain point in the image along the path of each ray through the image domain, and wherein the integration of the opacity value is terminated once a threshold value is reached.

According to a further aspect of the invention, the virtual display screen is in the form of a cube surrounding the selected point.

According to a further aspect of the invention, the virtual display screen is in the form of a cylinder surrounding the selected point.

According to a further aspect of the invention, the virtual display screen is in the form of a sphere surrounding the selected point.

According to a further aspect of the invention, the interactive display application is a stand alone application.

According to a further aspect of the invention, the interactive display application is an embedded application.

According to a further aspect of the invention, the interactive display application is a plug-in to another application.

According to a further aspect of the invention, the method further comprises annotating the panoramic digital photograph.

According to a further aspect of the invention, the method further comprises adding a hyperlink to the panoramic digital photograph.

According to a further aspect of the invention, the method further comprises integrating those opacity values corresponding to a type of tissue to be rendered in the panoramic digital photograph.

According to a further aspect of the invention, the panoramic digital photograph can be incorporated into a digital medical record database.

According to a further aspect of the invention, a digital medical record can be retrieved from said database over a computer network.

According to a further aspect of the invention, the interactive display application enables at least one of zooming the digital photograph, panning the digital photograph, and changing the viewing orientation of the digital photograph.

According to another aspect of the invention, there is provided a program storage device readable by a computer, tangibly embodying a program of instructions executable by the computer to perform the method steps for visualizing a digital medical image.

DETAILED DESCRIPTION OF THE PREFERRED EMBODIMENTS

Figure 2:
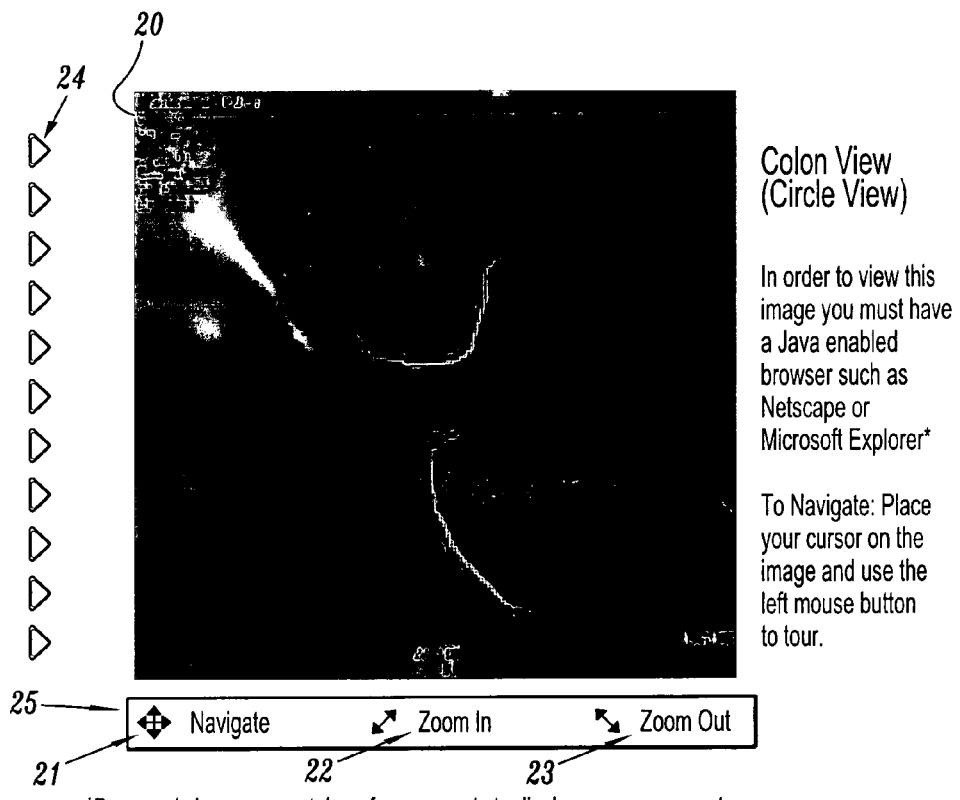
FIG. 2 presents an exemplary web page that allows a viewer to display an image and navigate through the image, according to an embodiment of the invention.

Exemplary embodiments of the invention as described herein generally include systems and methods for generating synthetic panoramic images from medical image data. In the interest of clarity, not all features of an actual implementation which are well known to those of skill in the art are described in detail herein.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel represents an intensity that can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Many websites provide a user with panoramic views and the ability to navigate through the views. For example, a real-estate website can provide a user with the ability to select a house or apartment to view, and then provide the user with a panoramic view that can simulate what a viewer would see if he or she were to turn completely around in a room. Typically, such websites provide the user with arrows or other on-screen buttons on which the user can click to initiate and control the navigation. In addition to controlling the direction of view, these buttons can also enable a user to zoom in on an object in a scene being viewed or back away from the object. Typically, these navigable views are enabled by providing digital 2-D photographs of the scenes to be displayed, and providing the website with a viewer for displaying the photograph. A panoramic view can be accomplished by taking multiple photographs of a scene, such as a room, where the camera remains stationary but the angle of view is shifted by a small angle. The angle is small enough to provide some overlap, and the resulting images can be stitched together to create the panoramic view.

According to an embodiment of the invention, generating a synthetic panoramic image from a medical image dataset would satisfy many low-end visualization needs and constraints. A medical image dataset typically comprises on the order of a giga-byte of data, whereas a panoramic image suitable for display could be as small as a mega-byte in size. In order to generate a panoramic image from a 3-D volumetric dataset, where the pixels form a 3-D rectangular array, one selects a point to serve as a viewing position, and then one selects one or more planar subset of points around the viewing point. For a panoramic view, a viewing point within the dataset is preferred. In one embodiment of the invention, six views are generated along each of the perpendicular viewing directions form the viewing point, to form a cubical panorama. In another embodiment of the invention, a cylindrical panorama can be simulated by generating a plurality of views by small changes in a viewing direction being rotated around a central axis. In another embodiment of the invention, a spherical panorama can be simulated by generating a plurality of views by small changes in a viewing direction about the central viewing point. These viewing geometries are exemplary, and polygonal, ellipsoidal or other views are possible and are within the scope of an embodiment of the invention.

According to an embodiment of the invention, the images generated according to a viewing direction can be 2-D slices from the volumetric dataset, where the slice is a predetermined pixel distance from the viewing point, and the extant of the slice is determined by the viewing angle.

According to another embodiment of the invention, a synthetic image is generated corresponding to each viewing direction, based on volume rendering techniques known in the art. In many imaging modalities, resulting intensity values or ranges of values can be correlated with specific types of tissue, enabling one to discriminate, for example, bone, muscle, flesh, and fat tissue, nerve fibers, blood vessels, organ walls, etc., based on the intensity ranges within the image. The raw intensity values in the image can serve as input to a transfer function whose output is a transparency or opacity value that can characterize the type of tissue. A user can then generate a synthetic image from a viewing point by propagating rays from the viewing point to a point in the 2-D image to be generated and integrating the transparency or opacity values along the path until a threshold opacity is reached, at which point the propagation is terminated. The use of opacity values to classify tissue also enables a user to select which tissue is to be displayed and only integrate opacity values corresponding to the selected tissue. In this way, a user can generate synthetic images showing, for example, only blood vessels, only muscle, only bone, etc.

Figure 1:
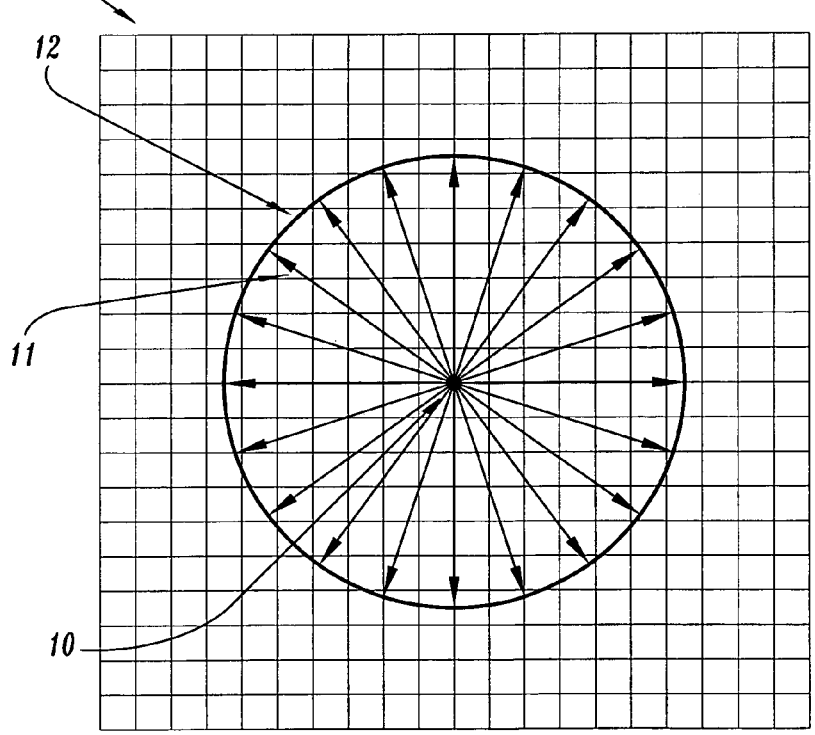
FIG. 1 presents a top-down schematic view of how a synthetic image is generated for cylindrical geometry, according to an embodiment of the invention.

FIG. 1 presents a top-down schematic view of how a synthetic image is generated for cylindrical geometry. A planar slice 15 of pixels is depicted, and a pixel 10 has been selected as a viewing point. A viewing axis goes through the point 10 in a direction normal to the plane of the figure. Rays 11 are propagated out from the viewing point 10 in the plane of the figure to a pixel in a virtual display screen 12, which can be represented by a 2-D array. Although not shown, rays can be propagated from the axis to the virtual display screen in the regions above and below the plane of the figure, so that each pixel in the virtual display screen is associated with a single ray.

Thus, according to an embodiment of then invention, the images comprising the panoramic image comprise synthetic images. Further, according to an embodiment of the invention, multiple panoramic images of the same viewing geometry (e.g. cylindrical) can be generated, each showing a specific tissue type.

Once a panoramic medical image has been generated from a medical image dataset, there are several interactive display options available. According to one embodiment of the invention, a stand-alone viewing application can be used to view the image. These viewing applications include, but are not limited to, programs such as Adobe Acrobat, the Windows Picture and Fax Viewer, etc. According to another embodiment of the invention, plug-ins for standard tools, such as web browsers and word processors, can be used to view the image. These plug-ins can include embedded applications, such as a Java enabled viewer running in a web browser, and other standard plug-ins for other consumer applications as are known in the art. According to an embodiment of the invention, a viewing application is provided with on-screen buttons or other mechanisms to allow a viewer to change the direction of view (i.e., panning) of the image being displayed in a monitor, or to zoom the image in or out.

FIG. 2 presents an exemplary web page that allows a viewer to display an image and navigate through the image. A synthetic panoramic image of a colon 20 is shown. A user can place the cursor on the image 20 in order to navigate about the image. Bar 25 below the image illustrates the shapes assumed by the cursor as it is moved about, and the actions associated with each shape. If the cursor is in the shape of the navigate cross 21, the user can press a mouse button and move the cursor in the direction he or she wishes to move. If the cursor is in the shape of the zoom-in arrow 22, the user can press a mouse button to enlarge the image, while if the cursor is in the shape of the zoom-out arrow 23, the user can press a mouse button to reduce the image. In addition, in some embodiments, when the cursor has an arrow shape, a user can move the cursor up or down, or left and right, to respectively, zoom-in or zoom-out the image. Buttons 24 on the left side can be associated with various user actions, such as presenting a list of available images to display, or to blend two or more images on the web page. Although in a Windows environment, one would typically use the left mouse button to do the navigation, it is to be understood that the navigation can be performed by the right button, or by a single button mouse.

According to another embodiment of the invention, the viewing applications or plug-ins can include a means to annotate the image dataset. Such annotations can include, but are not limited to, text, symbol, modeled elements, and hyperlinks. The ability to annotate enables a physician, radiologist, or other technician to indicate an object of interest in an image, such as a polyp in a virtual colonoscopy. The annotation could cause a change in the mouse cursor, to indicate the presence of a hyperlink to further information about the annotated object. In addition, the annotation can serve as a marker so that changes in shape of size of the object in subsequent images can be tracked and analyzed.

An interactive viewing application according to an embodiment of the invention would enable a viewer to zoom, pan, and change viewing orientation. In addition, an interactive viewing application would allow a viewer to change viewing parameters. For example, in an application where multiple synthetic images are provided, a viewer can switch between a view that shows bones to a view that shows muscle. In another embodiment of the invention, an interactive viewing application would enable a viewer to blend images generated with different display parameters, for example, to overlay an image showing bones with an image showing blood vessels. In another embodiment of the invention, an interactive viewing application would indicate hot spots in an image, indicative of, for example, an annotation or link to additional information regarding the image, additional view points for further volumetric renderings of the subject matter or to additional visualization techniques, such as an animation of a camera circling around a particular detail. In another embodiment of the invention, an interactive viewing application allows the view to add his or her own annotations to the image.

Figure 3:
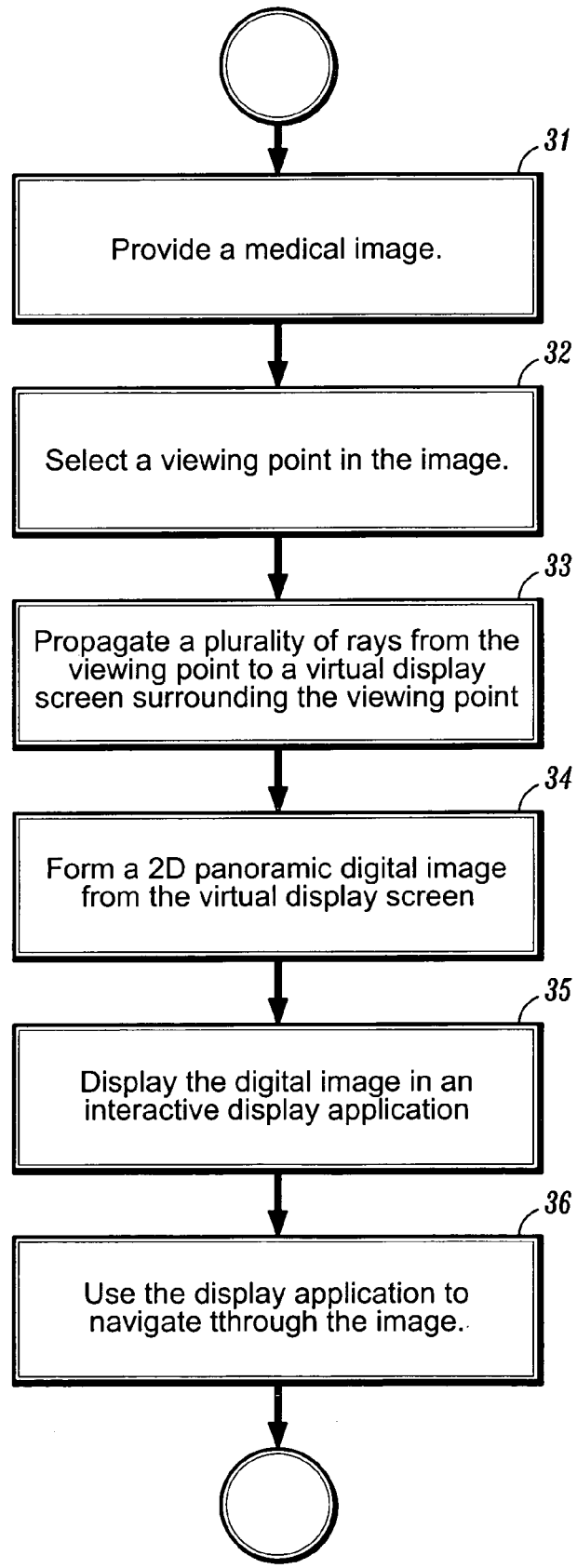
FIG. 3 is a flow chart of a method for panoramic visualization of an image volume, according to an embodiment of the invention.

A flow chart of a method of viewing panoramic images, according to an embodiment of the invention, is depicted in FIG. 3. Referring to the figure, a digital medical image with a plurality of intensities corresponding to a domain of points in a 3D space is provided in step 31. A viewing point in the image is selected at step 32. At step 33, a plurality of rays are propagated from the viewing point to a virtual display screen surrounding the viewing point. Each pixel on the virtual display screen is associated with a ray. A 2D panoramic digital image is formed from the virtual display screen at step 34. At step 35, the digital image is displayed in an interactive display application. The application preferably provides buttons or other means for allowing a user to select images for viewing, navigating through the image, including panning, changing the viewing direction, and zooming the image in or out, and for annotating the image. The user can, at step 36, perform one or more of the navigation operations to view the image. The user can also annotate the image, and can select additional images for a simultaneous, blended display of two or more images.

Applications of the interactive panoramic display, according to an embodiment of the invention, include visualizing digital image data over the Internet, such as where a patient or user is using a web browser to access a web site servicing a medical record database server, visualizing digital image data on physical media, such as a CD provided by e medical clinic or office. The visualized data can be, optionally, part of a digital patient record, and can include data acquired during a medical screening. Another application, according to another embodiment of the invention, is the browsing of large image datasets, wherein the interactive panoramic display can be used as a tool for data retrieval.

It is to be understood that, although the interactive display of panoramic images has been presented in the context of medical image display, this concept can be extended to other fields, such as the visualization of results from an industrial CT for quality control. The input image data in these cases can be volumetric data, polygonal mesh data, etc., and can result from measurements, simulations, or be created. Such applications are within the scope of an embodiment of the invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
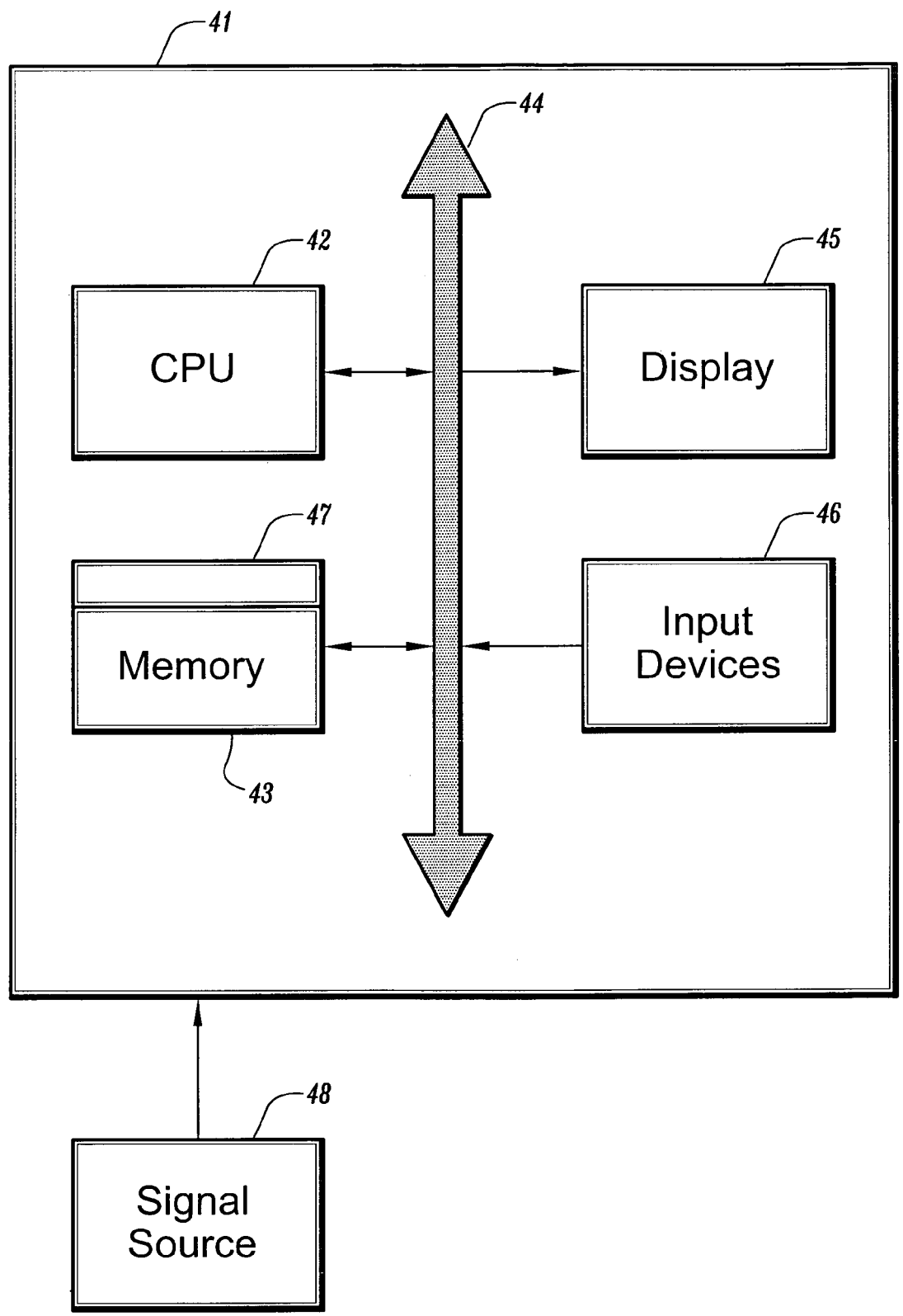
FIG. 4 is a block diagram of an exemplary computer system for implementing a panoramic visualization system, according to an embodiment of the invention.

Referring now to FIG. 4, according to an embodiment of the present invention, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for visualizing a digital medical image, said method comprising the steps of:
   providing an image with a plurality of intensities corresponding to a domain of points in a 3-dimensional space;
   selecting a point in the domain of the image;
   propagating a plurality of rays from said selected point to a virtual display screen that surrounds the selected point, wherein said virtual display screen comprises a plurality of pixels, and a value associated with each pixel is computed along the path of each ray through the image domain; and
   generating a 2-dimensional panoramic digital photograph from said virtual display screen, wherein said panoramic digital photograph is at least two orders of magnitude smaller than said image and is adapted for display on a computer display monitor,
   wherein said 2-dimensional panoramic digital photograph is adapted for display in an interactive display application over a low-bandwidth connection.

2. The method of claim 1, wherein the value associated with each pixel is computed by integrating an opacity value associated with each domain point in the image along the path of each ray through the image domain, and wherein the integration of the opacity value is terminated once a threshold value is reached.

3. The method of claim 1, wherein the virtual display screen is in the form of a cube surrounding the selected point.

4. The method of claim 1, wherein the virtual display screen is in the form of a cylinder surrounding the selected point.

5. The method of claim 1, wherein the virtual display screen is in the form of a sphere surrounding the selected point.

6. The method of claim 1 wherein the interactive display application is a stand alone application.

7. The method of claim 1, wherein the interactive display application is an embedded application.

8. The method of claim 1, wherein the interactive display application is a plug-in to another application.

9. The method of claim 1, further comprising annotating the panoramic digital photograph.

10. The method of claim 1, farther comprising adding a hyperlink to the panoramic digital photograph.

11. The method of claim 2, further comprising integrating those opacity values corresponding to a type of tissue to be rendered in the panoramic digital photograph.

12. The method of claim 1, wherein the panoramic digital photograph can be incorporated into a digital medical record database.

13. The method of claim 12, wherein a digital medical record can be retrieved from said database over a computer network.

14. The method of claim 1, wherein the interactive display application enables at least one of zooming the digital photograph, panning the digital photograph, and changing the viewing orientation of the digital photograph.

15. A method for displaying a 3-dimensional digital image, said method comprising the steps of:
   providing 3-dimensional (3D) image with a plurality of intensities corresponding to a domain of points in a 3-dimensional space;
   selecting a point in the domain of the 3D image and
   creating a 2-dimensional panoramic digital image by propagating a plurality of rays from said selected point wherein said panoramic digital image comprises a plurality of pixels, each pixel being associated with one of the propagated rays, wherein a value associated with each pixel is computed by integrating an opacity value associated with each domain point in the 3D image along the path of each ray through the 3D image domain, wherein the integration of the opacity value is terminated once a threshold value is reached, and wherein said panoramic digital image is at least two orders of magnitude smaller than said 3D image and is adapted for display on a computer display monitor,
   wherein said 2-dimensional panoramic digital photograph is adapted for display in an interactive display device over a low-bandwidth connection.

16. The method of claim 15, wherein said 3D image is a medical image, the method further comprising integrating those opacity values corresponding to a type of tissue to be rendered in the panoramic digital image.

17. The method of claim 16, further comprising creating a plurality of panoramic digital images, wherein each panoramic digital image comprises a rendering of a single type of tissue.

18. The method of claim 17, further comprising simultaneously viewing two or more panoramic digital images in said interactive display application.

19. The method of claim 15 wherein said panoramic digital image is formed from a virtual digital screen that surrounds the selected point in the 3D image, and wherein said rays are propagated in all directions from said selected point.

20. The method of claim 15, further comprising navigating said 2-dimensional panoramic digital image in said display application, and retrieving said 3-dimensional digital image.

21. A program storage device readable by a computer, tangibly embodying a program of instructions executable by the computer to perform the method steps for visualizing a digital medical image, said method comprising the steps of:
   providing an image with a plurality of intensities corresponding to a domain of points in a 3-dimensional space;
   selecting a point in the domain of the image;
   propagating a plurality of rays from said selected point to a virtual display screen that surrounds the selected point, wherein said virtual display screen comprises a plurality of pixels, and a value associated with each pixel is computed along the path of each ray through the image domain; and
   generating a panoramic digital photograph from said virtual display screen, wherein said panoramic digital photograph is at least two orders of magnitude smaller than said image and is adapted for display on a computer display monitor, wherein said 2-dimensional panoramic digital photograph is adapted for display in an interactive display application over a low-bandwidth connection.

22. The computer readable program storage device of claim 21, wherein the value associated with each pixel is computed by integrating an opacity value associated with each domain point in the image along the path of each ray through the image domain and wherein the integration of the opacity value is terminated once a threshold value is reached.

23. The computer readable program storage device of claim 21, wherein the virtual display screen is in the form of a cube surrounding the selected point.

24. The computer readable program storage device of claim 21, wherein the virtual display screen is in the form of a cylinder surrounding the selected point.

25. The computer readable program storage device of claim 21, wherein the virtual display screen is in the form of a sphere surrounding the selected point.

26. The computer readable program storage device of claim 21, wherein the interactive display application is a stand alone application.

27. The computer readable program storage device of claim 21, wherein the interactive display application is an embedded application.

28. The computer readable program storage device of claim 21, wherein the interactive display application is a plug-in to another application.

29. The computer readable program storage device of claim 21, the method further comprising annotating the panoramic digital photograph.

30. The computer readable program storage device of claim 21, the method further comprising adding a hyperlink to the panoramic digital photograph.

31. The computer readable program storage device of claim 22, the method further comprising integrating those opacity values corresponding to a type of tissue to be rendered in the panoramic digital photograph.

32. The computer readable program storage device of claim 21, wherein the panoramic digital photograph can be incorporated into a digital medical record database.

33. The computer readable program storage device of claim 32, wherein a digital medical record can be retrieved from said database over a computer network.

34. The computer readable program storage device of claim 21, wherein the interactive display application enables at least one of zooming the digital photograph, panning the digital photograph, and changing the viewing orientation of the digital photograph.

* * * * *